United States Patent [19]
Goire et al.

[11] Patent Number: 5,434,999
[45] Date of Patent: Jul. 18, 1995

[54] SAFEGUARDED REMOTE LOADING OF SERVICE PROGRAMS BY AUTHORIZING LOADING IN PROTECTED MEMORY ZONES IN A TERMINAL

[75] Inventors: Christian Goire, Les Clayes Sous Bois; Alain Sigaud, Elancourt; Eric Moyal, Paris, all of France

[73] Assignee: Bull CP8, Trappe, France

[21] Appl. No.: 44,116

[22] Filed: Apr. 8, 1993

Related U.S. Application Data

[63] Continuation of Ser. No. 499,504, Sep. 10, 1990, abandoned.

[30] Foreign Application Priority Data

Nov. 9, 1988 [FR] France .................. 88 14604

[51] Int. Cl.⁶ .............................................. G06F 12/14
[52] U.S. Cl. ...................... 395/575; 395/425; 395/700; 364/246.6; 364/260.1; 364/975.1; 364/969.4; 364/DIG. 1; 364/DIG. 2
[58] Field of Search .............. 395/425, 575, 700

[56] References Cited

U.S. PATENT DOCUMENTS

| | | | |
|---|---|---|---|
| 4,177,510 | 12/1979 | Appell et al. | 395/425 |
| 4,366,537 | 12/1982 | Heller et al. | 395/425 |
| 4,558,176 | 12/1985 | Arnold et al. | 178/22.08 |
| 4,590,552 | 5/1986 | Guttag et al. | 395/425 |
| 4,683,553 | 7/1987 | Mollier | 380/4 |
| 4,742,215 | 5/1988 | Daughters et al. | 235/487 |
| 4,809,160 | 2/1989 | Mahon et al. | 395/700 |
| 4,817,140 | 3/1989 | Chandra et al. | 380/4 |
| 4,849,614 | 7/1989 | Watanabe et al. | 235/379 |
| 4,851,994 | 7/1989 | Toda et al. | 395/275 |
| 4,882,474 | 11/1989 | Anderl et al. | 235/380 |
| 4,882,705 | 11/1989 | Yasue | 395/575 |
| 4,885,788 | 12/1989 | Takaragi et al. | 380/23 |
| 4,888,802 | 12/1989 | Cooney | 380/49 |
| 4,947,318 | 8/1990 | Mineo | 364/200 |
| 4,965,827 | 10/1990 | McDonald | 380/25 |
| 5,014,312 | 5/1991 | Lisimague et al. | 380/25 |

FOREIGN PATENT DOCUMENTS

| | | |
|---|---|---|
| 0083209 | 7/1983 | European Pat. Off. . |
| 0218176 | 4/1987 | European Pat. Off. . |
| 0268141 | 5/1988 | European Pat. Off. . |
| 2181281 | 4/1987 | United Kingdom . |

OTHER PUBLICATIONS

Barnes, B. E., "Computer Program Relocation and Segmentation" IBM Tech. Discl. Bulletin vol. 25, No. 8, Jan. 1983.

Primary Examiner—Parshotam S. Lall
Assistant Examiner—Ken S. Kim
Attorney, Agent, or Firm—Kerkam, Stowell, Kondracki & Clarke; Edward J. Kondracki

[57] ABSTRACT

The present invention relates to a system including a terminal connected by a transmission line to a central processing unit, the terminal including a memory divided into a program memory and a working memory of the RAM type, the program memory in turn including a volatile memory, a safeguarded memory of the EEPROM type or RAM type with batteries, and a resident memory of the ROM or PROM type, characterized in that each of the memories comprising the program memory is divided into a noncertified zone, the terminal including an interpreter program for interpreting between a program written in a high-level universal compact language and the language specific to the microprocessor of the terminal, this interpreter program being capable of access to each of the memory divisions, and a remote loading monitoring program including at least one instruction CHSB, the command word of which is stored in one of the registers and expresses the remote loading possibilities of the various zones.

3 Claims, 4 Drawing Sheets

SAFEGUARDED REMOTE LOADING OF SERVICE PROGRAMS BY AUTHORIZING LOADING IN PROTECTED MEMORY ZONES IN A TERMINAL

This application is a continuation of application Ser. No. 07/499,504, filed Sep. 10, 1990 now abandoned.

BACKGROUND OF THE INVENTION

The present invention relates to a system of secure remote loading of a terminal and the method used by such a system.

The ability to load data processing machines in a remote manner is known, but the problem that arises is to protect the machines against inopportune or even fraudulent remote loading. If a machine includes memories divided into certified program zones (CPZ) and noncertified program zones (NPZ), means must be provided to assure that the programs remote-loaded into the certified zone were loaded by a procedure that guarantees that they were not loaded fraudulently. The problem is also how to propose a flexible, hybrid system that makes it possible to be both highly secure and open at the same time, to variably great extents, as needed and depending on the applications.

SUMMARY OF THE INVENTION

The object is attained in that the system, including a central processing unit connected by a transmission line to a terminal that has a memory divided into a program memory and a working memory, the program memory in turn having a volatile memory, a safeguarded memory of the EEPROM type or RAM type with a battery, and a resident memory of the ROM or PROM type, is characterized in that each of the memories comprising the program memory are divided into at least one noncertified and one certified program zone; the terminal includes an interpreter program that interprets between a program written in a universal compact language and the language specific to the microprocessor of the terminal and an order or command management program tasked with executing a command authorized by a command word, the interpreter and command management program having a priority level enabling access to each of the portions of the memory, and a remote loading control program including at least one instruction (CHSB), the command word of which is stored in one of the registers of the working zone and expresses the remote loading possibilities of the various zones.

In another characteristic, the command word includes a first field intended to command a remote loading and a reading in a noncertified zone; a second field intended to command a remote loading and a reading in a certified zone; a third field intended to authorize the starting of a program in a noncertified zone NPZ; a fourth field intended to authorize the starting of a program in a certified zone CPZ; a fifth field intended to command a remote loading and a reading of the registers of the working memory; a sixth field enabling authorization of the opening of a session.

In another characteristic, the remote loading program includes an instruction for memory block transfer from a noncertified zone to a certified zone; the execution of this instruction is enabled by the interpreter only in the case where this instruction is in turn stored in a certified zone. The remote loading program cannot be accessed except at a predetermined address beginning with a specific instruction.

In another characteristic, the remote loading program includes an instruction for transfer of register blocks to the certified zone that can be executed solely in the case where the instruction is stored in the certified zone.

In another characteristic, the program memory further includes mail box zones.

In another characteristic, the mail box zones are accessible only upon presentation of a key.

Further characteristics and advantages of the present invention will become more apparent from reading the ensuing description, taken in conjunction with the accompanying drawings, in which:

DETAILED DESCRIPTION OF THE INVENTION

Figure 1:
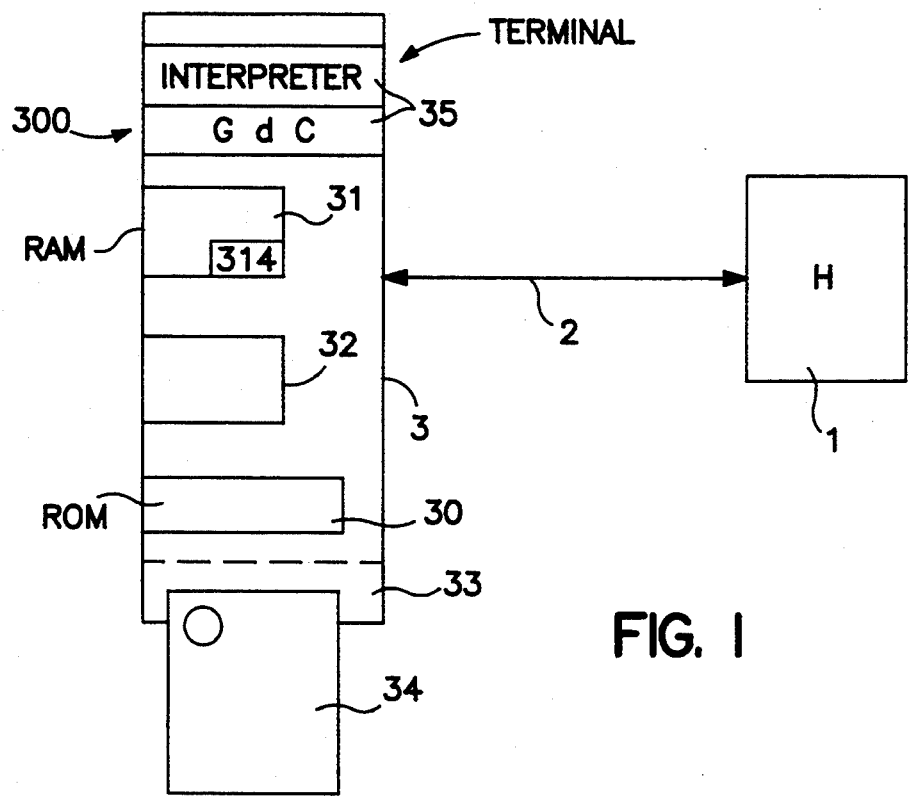
FIG. 1 is a schematic view of a system according to the invention.

FIG. 1 shows a main or host computer (1), connected by a data transmission line (2) to a terminal or reader (3) remote from this main computer (1). The terminal (3) includes a set of memories (30, 31, 32) organized as follows. A first memory (31) comprises a volatile memory of the RAM type, a second memory (32) comprises a safeguarded memory of the RAM type safeguarded by a battery or EEPROM memory, and a third memory (30) comprising a resident memory of the PROM or ROM type. The terminal further includes a reader (33) of portable items (34) which comprise a microcomputer circuit, including a microprocessor and a programmable memory, that can be connected to the outside via contacts. For further details on the structure of such a portable item, see French Patent Application 2 401 459, corresponding to U.S. Pat. No. 4,211,919; for details on the microcomputer associated with a programmable memory, see French Patent Application 2 461 301, corresponding to U.S. Pat. No. 4,382,279.

Figure 2:
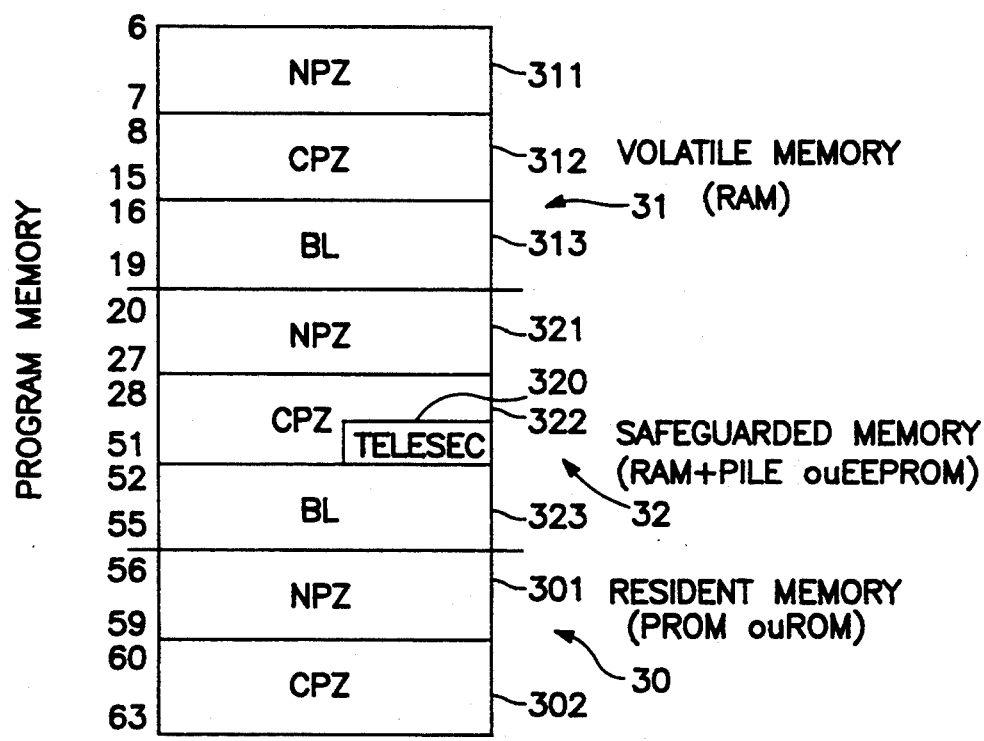
FIG. 2 shows the organization chart of the memories of a terminal.

This set of memories is used as an executable and interpretable program memory and as a working zone made up of general-purpose registers. Essentially, the working zone comprises a portion (314) of the RAM memory (31). The program memory (FIG. 2) contains 20 pages of memory of 16K bytes each of the volatile memory (31). The safeguarded memory comprises 36 pages of 16K bytes of the memory (32), and the resident memory comprises eight pages of 16K bytes of the memory (30). Each volatile memory zone, safeguarded memory zone and resident memory zone is subdivided into two or three subzones, called certified program zones CPZ, noncertified program zones NPZ and mail boxes BL.

The subdivisions of the memories define the levels of security for the programs contained by these memories. Thus the programs implanted in a CPZ zone will be said to have a certified security level, while programs implanted in an NPZ zone are programs of a noncertified security level. The mail boxes are zones of controlled access that are reached with a key. Essentially they contain data. An interpreter and order or command manager program (GdC) resident in a memory (35) of the ROM or PROM type assures interpretation between the programs written in a high-level compact language, which is independent of the hardware used, and the language specific to the microprocessor installed in the terminal. The order manager-itself is tasked with executing an order authorized by one of the command bytes ECW1, ECW2 described hereinafter. This interpreter and order manager program is given the greatest rights of access, which are greater than those of the zones NPZ or CPZ. The programs implanted in the CPZ zones of the memory enable reading and writing in all the NPZ or CPZ zones of either the volatile memory (31), the safeguarded memory (32) or the resident memory (30), but only reading and writing under the control of the interpreter program and an application program in the mailbox zones; the rules of writing and reading are defined by the application program at the moment the mail box is created. The programs implanted in the NPZ zones (311, 321, 301) are assigned to the noncertified security level; the only right they have is to perform reading/writing in the NPZ zone (311, 321) of the safeguarded and resident volatile memories, and they can perform the reading and writing only under the control of the interpreter and command manager program (300) in the mail box zones (313, 323) of the volatile (31) or safeguarded (32) memories.

Figures 4, 5:
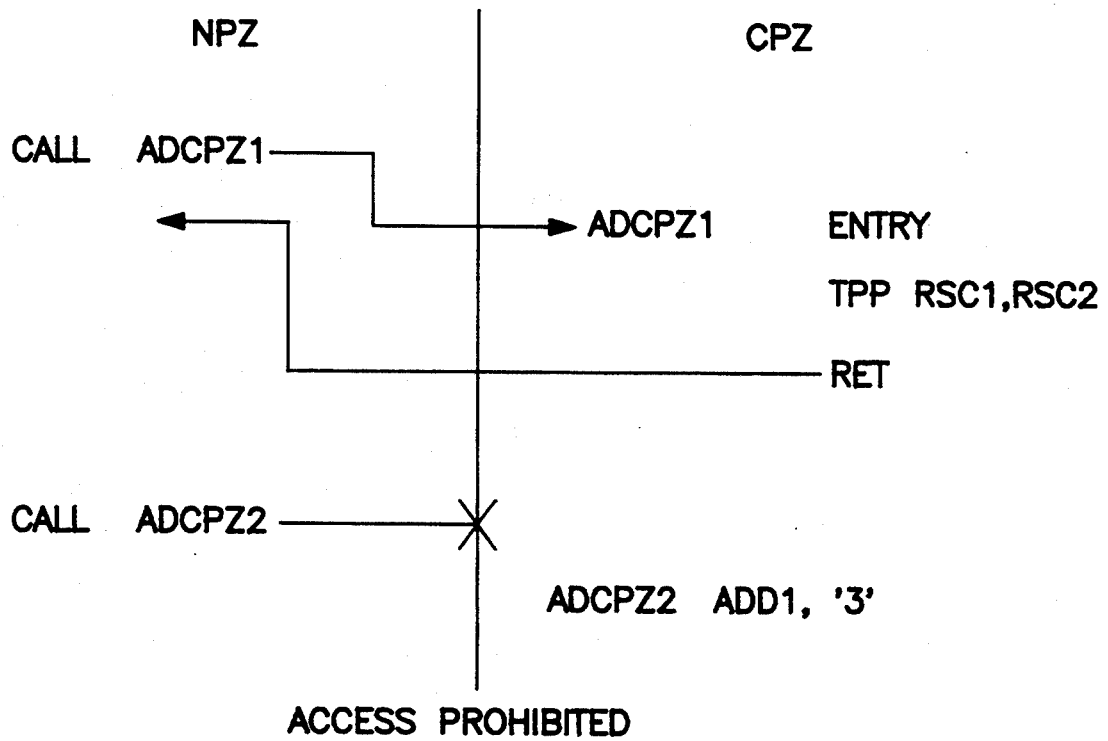
FIG. 4 is a summary of the division of the memories of the terminal.
FIG. 5 represents a remote loading procedure according to the invention.

FIG. 4 summarizes the division of the memories of the terminal and the various rights of access to these memories.

The operation of the system will be explained below.

Figure 3:
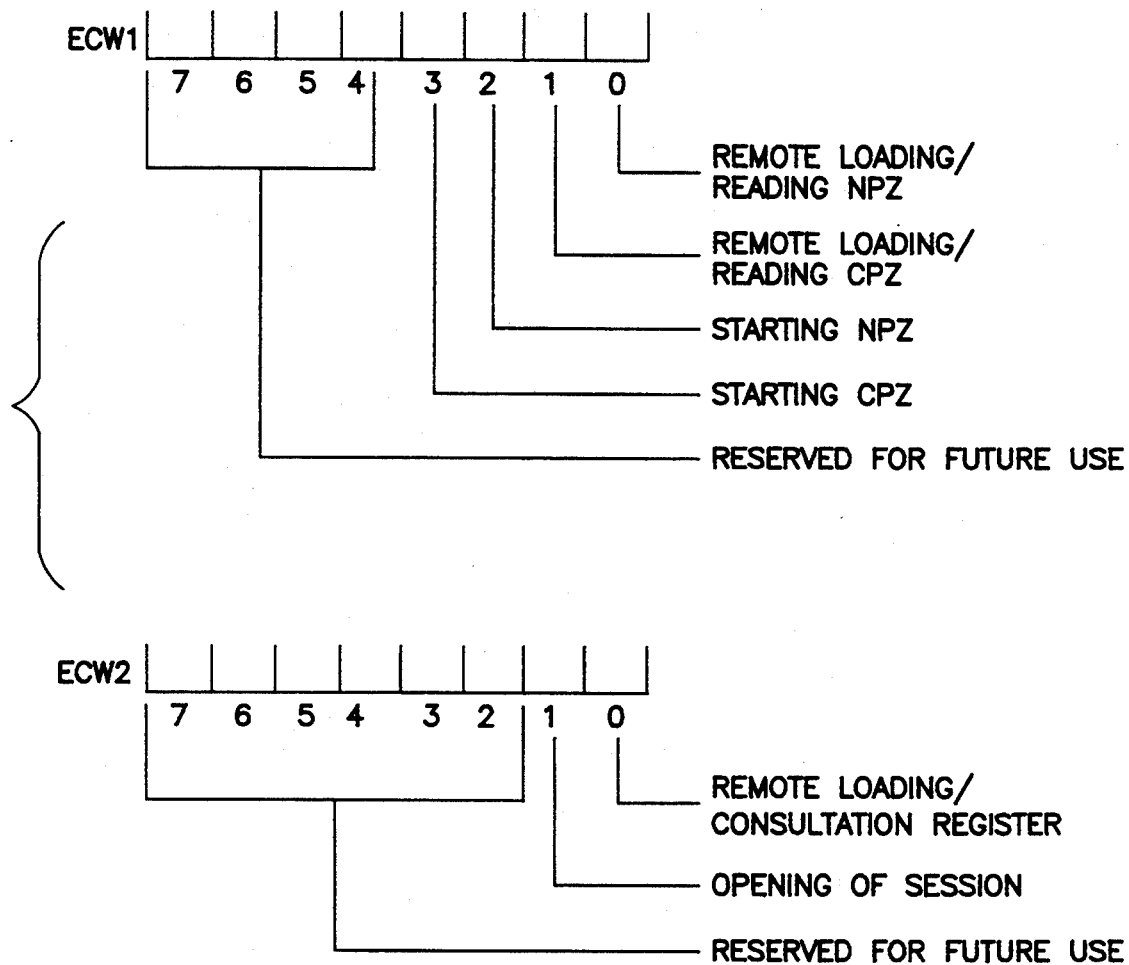
FIG. 3 shows the contents of the word of the two registers that expresses the possibilities offered to the terminal.

Initially, a terminal equipped with a reader contains at least one instruction CHSB in the safeguarded memory zone; the command bytes of this instruction enable the acceptance, or not, of certain orders sent by the host remote loading computer. This instruction CHSB includes two command bytes ECW1 and ECW2, the bits of which shown in FIG. 3 are loaded into the registers of the working memory (314) at the addresses FFEB and FFEC of this memory, to indicate to the order manager those orders that can be accepted or not. Upon execution and decoding of a remote loading order, a program starting order, a reading order, or a session opening order, the order manager will read the command bytes. Thus, beginning with the least significant bits and proceeding toward the most significant bits, the first bit of the first byte ECW1 authorizes the remote loading and reading of the zone NPZ;

the second bit authorizes the remote loading and reading of the zone CPZ;

the third bit authorizes the external starting, from the host computer (1), of a program in NPZ;

the fourth bit authorizes the external starting, from the host computer (1), of a program in CPZ;

the fifth significant bit comprising the first bit of the second command word ECW2 authorizes the remote loading and reading of a register bank comprising one portion of the working memory (314); and the sixth bit comprising the second bit of the second byte ECW2 authorizes the opening of a session.

When the bits of these two words are at zero, the corresponding remote loading, program starting or session opening orders are not taken into account by the order manager of the terminal; when these bits are at one, the orders are taken into account.

As shipped, the words ECW1, ECW2 have their bits set by default such as to enable all the possibilities for acceptance of the various orders. Accordingly, this authorizes the host computer to directly remote-load a TELESEC program (3220) in the CPZ zone, which will consequently permit the performance of secure remote loading. This remote loading may or may not be preceded by a certification or authentication process.

Another solution may also comprise shipping the terminals such that they are already equipped in a CPZ zone (322) of the safeguarded memory with a program for secure remote loading. The program, if necessary, modifies the registers ECW1/ECW2 and executes a set of instructions that make it possible to employ two possible scenarios. In a first scenario, by a branch instruction GOTO or CALL followed by the address (ADCPZ1) of the beginning of the secure remote loading program TELESEC, the program remote-loaded by the host computer can call this program implanted in the CPZ zone, this program beginning imperatively by an ENTRY instruction. The TELESEC program shown in FIG. 5 includes among others an instruction TPP RSC1, RSC2 and terminates with an instruction RET yielding to the program located in NPZ.

The ENTRY instruction is a point of obligatory entry of a certified-level routine for any program located in NPZ. This makes it possible to prevent the host computer or a program in NPZ from being capable of access to any point of a program located in CPZ. Thus as shown in FIG. 5, in the case where the program in NPZ includes a CALL AD CPZ2 instruction requesting connection to the address CPZ2 of a zone CPZ, and the instruction to this address is other than an ENTRY instruction, the interpreter will detect a forbidden access.

The instruction TPP enables recopying of a program memory block SC1 in a program memory block SC2. Nevertheless, before this instruction is executed the interpreter will verify that this instruction is executable, by comparing the address at which this instruction TPP is located and the address of the memory block SC2. In the case where the instruction TPP is located in the memory zone NPZ and requests the recopying of a program memory block located in a zone NPZ to a program memory block located in a zone CPZ, the interpreter will not authorize the execution of the instruction. In that case, the interpreter will stop, or will reroute itself to a subprogram for error processing, to signal to the user that the interpreter did not want to execute that instruction.

The interpreter performs the systematic checking of any instruction, regardless of where it originates, manipulating an address in order to verify whether the region to which access is requested is authorized, beginning at the region where this instruction comes from. In this way, verification is performed that the program levels corresponding to the region from which the instruction comes is indeed in agreement with the corresponding access authorizations for this level that are shown in FIG. 4. Thus the word ECW1 must have the bit 0 and the bit 2 at the level "1", and the word ECW2 must have bit 1 at the level "1", to permit opening of a session, for example a remote loading session. The only possibilities retained are of remote loading and reading in zone NPZ and starting a program in zone NPZ. Consequently, any program remote-loaded by the host computer in zone NPZ will include an instruction to call the program TELESEC arranged in a zone CPZ, making it possible to make the transfer from a memory block of a zone NPZ to a memory block of a zone CPZ.

Another scenario may comprise remote loading of a program X in NPZ, and then authenticating this program by an authentication and certification program in CPZ. The starting of the program X can be done by a starting instruction RUN originating in the host computer, if ECW authorizes it.

If the program X is started while in a zone NPZ, the program has few rights. Another possibility is to implant the program X in the zone CPZ, as has been seen above; in that case it has all the rights of a program in the zone CPZ.

An authentication procedure may for example be one similar to that described in French Patent Application No. 86 08 654, filed on Jun. 16, 1986 in the name of the company doing business as BULL CP8. Similarly, a procedure for certifying the authenticity of data may for example be one similar to that described in French Patent Application No. 86 10 206, filed on Jul. 11, 1986, again in the name of BULL CP8. By modifying the command words ECW1/ECW2, it has been seen that the conditions for remote loading from a zone NPZ to a zone CPZ can be modified, and the order manager is capable of determining these conditions by proceeding to read the command words ECW1/ECW2 that are stored in the registers of the working zone.

It should be noted that ECW1, ECW2 determine a certain number of levels, as follows:

The opening of the session may be authorized or not; if not, the machine is completely closed.

The opening of the session is authorized; in this case, loading can be done either into CPZ or NPZ in accordance with ECW. However, external starting can certainly be forbidden, in order to have the option of internal authentication by a CALL or GOTO instruction, permitting rerouting to the authentication program. The starting instruction RUN, if it has not been authorized already, is authorized done by modifying ECW.

Figure 6:
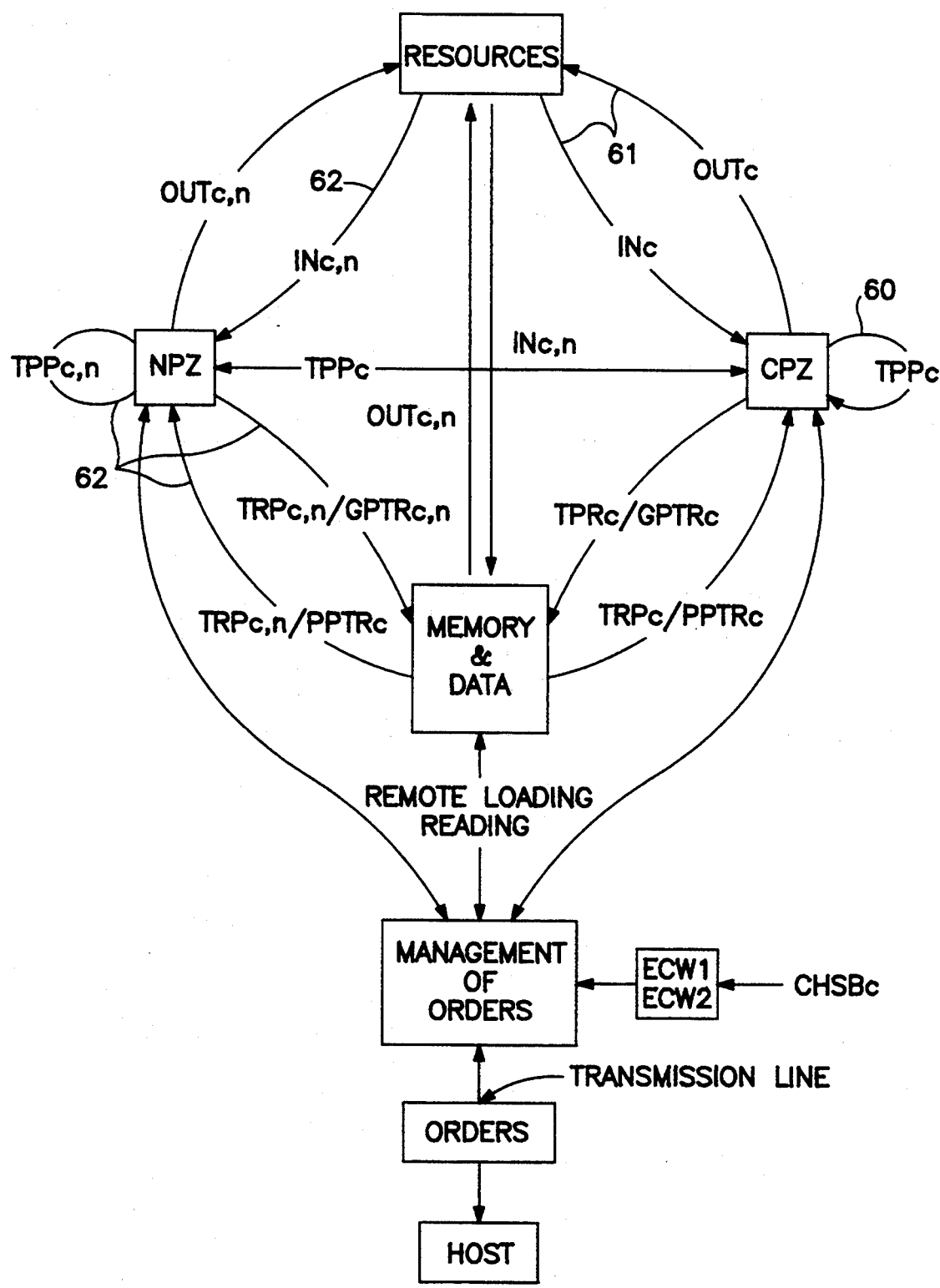
FIG. 6 represents the information transfers that can be performed between the entities of the invention.

The possibilities and flexibility of the system of the invention are illustrated by FIG. 6.

The diagram shown in FIG. 6 illustrates the information transfers that can be attained between the following entities of the invention:

zone NPZ of the program memory;
zone CPZ of the program memory;
resources, which may be a keyboard, display unit, etc.;
data memory comprising a portion of RAM (31);
host computer.

The arrows in the figure indicate the direction of information flow, and the text associated with the arrow defines the following:

the instruction permitting the transfer action.
The instructions are as follows:
OUT or IN, which are input-output instructions;
TPP, transfer from program memory to program memory;
TPR or GPTR, transfer from program memory to data memory;
TRP or PPTR, transfer from data memory to program memory.
The type of memory where the instruction must be located. The type is specified by one or two letters added to the acronym.

The lower-case c specifies that the instruction is in CPZ only. The lower-case letters n, c specify that the instruction is in CPZ or NPZ. For example the loop numbered 60 means that information can be transferred from CPZ to CPZ solely by means of the instruction TPP implanted in CPZ.

The exchanges represented by reference numeral 61 specify that information can be transferred between the resources of the system and the zone CPZ solely by means of an input-output instruction implanted in zone CPZ.

The exchanges represented by reference numeral 62 specify that information can be transferred between a zone NPZ and another entity of the system solely by means of an instruction implanted in CPZ or in NPZ.

With respect to the order manager, it executes the orders for remote loading/reading as a function of the value ECW1/ECW2, set by means of the instruction CHSB implanted solely in CPZ.

We claim:

1. A terminal for delivering services to a user by executing a service program and having a loading manager for managing a first loading of said program or further loadings for updating said program from a source external to said terminal, said manager, comprising:

an information processor and a program memory, said program memory being adapted to store said service program and being divided into a noncertified zone NPZ and a certified zone CPZ, said certified zone having a security level higher than said noncertified zone wherein a service program loaded in the certified zone allows additional operations to be performed which are not allowed in the noncertified zone, wherein a transfer of a service program from said noncertified zone to said certified zone for enhancing said program to allow said additional operations requires authentication of a content of the service program residing in said noncertified zone, by checking that the service program includes authenticating data identifying a duly entitled authority;

said processor including a command authorizing word register, a command authorizing word ECW contained in said register for defining whether loading of the service program in any zone of the program memory from a source external to the terminal is allowed;

a command manager for executing commands of the processor for loading the service program in either of the certified and noncertified zones of the program memory, said command manager reading said command authorizing word before execution by the processor and allowing said execution only if authorized by said command authorizing word; and loading monitoring security means TELESEC including a set of instructions stored in the certified memory zone by which the processor loads said command authorizing word in said command authorizing word register of the processor based on predetermined rights associated with said terminal and for authenticating any service program to be transferred from the noncertified zone to the certified zone, wherein loading of a service program in program memory comprises loading the command authorizing word ECW if said word is not yet loaded, reading said word and loading the program in a requested memory zone if allowed, and if said loading is requested in a certified zone and is not allowed, said program is loaded in a noncertified zone and authenticated by said loading monitoring security means TELESEC and transferred to a certified zone if authenticated, said service program being executed in said certified zone.

2. The terminal of claim 1, wherein said command authorizing word ECW further comprises:

a first field for authorizing a loading to and a reading from the noncertified memory zone NPZ;

a second field for authorizing a loading to and a reading from the certified memory zone CPZ;

a third field for authorizing starting of a program in the noncertified memory zone NPZ;

a fourth field for authorizing starting of a program in the certified memory zone CPZ; and a fifth field for authorizing opening of a session between the terminal and an external loading means.

3. The terminal of claim 1, further comprising:

means for preventing access to said set of instructions of the security means TELESEC except at a routine address beginning with a specific instruction (ENTRY).

* * * * *